United States Patent [19]
Maxwell et al.

[11] Patent Number: 5,672,555
[45] Date of Patent: Sep. 30, 1997

[54] KAOLIN-POTASSIUM ACETATE INTERCALATION COMPLEX AND PROCESS OF FORMING SAME

[75] Inventors: Chris B. Maxwell, Evans; Prakash B. Malla, Dublin, both of Ga.

[73] Assignee: Thiele Kaolin Company, Sandersville, Ga.

[21] Appl. No.: 608,639

[22] Filed: Feb. 29, 1996

[51] Int. Cl.$^6$ .................................................. C04B 33/04
[52] U.S. Cl. .................... 501/147; 501/148; 106/416; 106/487; 502/80; 162/181.8
[58] Field of Search ................... 501/146, 148, 501/147; 106/416, 487; 502/80; 162/181.8

[56] References Cited

U.S. PATENT DOCUMENTS

| | | | |
|---|---|---|---|
| 4,159,994 | 7/1979 | Seto et al. | 260/448 |
| 5,326,734 | 7/1994 | Vaughan | 502/80 |
| 5,416,051 | 5/1995 | Vaughan | 502/80 |

OTHER PUBLICATIONS

Feld, et al., "Paper Coating Clay From Coarse Georgia Kaolins By A New Attrition–Grinding Process", Report Of Investigations 5697, U.S. Department of Interior, Bureau of Mines, pp. 1–20 (1960) No month.

Velho & Gomes, Characterization of Portuguese kaolins for the paper industry: beneficiation through new delamination techniques, "Applied Clay Science", vol. 6, pp. 155–170 (1991) No month.

Wada, Lattice Expansion of Kaolin Minerals By Treatment With Potassium Acetate, "American Mineralogist", vol. 46, pp. 78–91, Jan.–Feb., (1961) No month.

Wiewiora & Brindley, Potassium Acetate Intercalation in Kaolinite and its Removal: Effect of Material Characteristics, "Proceedings of the International Clay Conference", vol. 1, pp. 723–733 (1969) No month.

Andrew et al., Intersalation as a Technique for Differentation of Kaolinite from Chloritic Minerals by X-Ray Diffraction, "Soil Science Proceedings", pp. 422–424 (1960) No month.

Kristof et al., Intercalation study of clay minerals by Fourier transform infrared spectrometry, "Vibrational Spectroscopy", vol. 5, pp. 61–67 (1993) No month.

Smith et al., Mechanism for Intercalation of Kaolinite by Alkali Acetates, "Science", vol. 153, pp. 741–743 (1966) No month.

Weiss et al., Kaolinite–Einlagerungs Verbindungen –"Proceedings of the International Clay Conference", vol. 1, pp. 287–305 (1963) (In German). English translation of pp. 287, 288, 296 and 297 also provided No month.

*Primary Examiner*—Karl Group
*Attorney, Agent, or Firm*—Jones & Askew

[57] ABSTRACT

A process for intercalating potassium acetate molecules in kaolin clay particles to achieve delamination has been developed by mixing kaolin clay particles, potassium acetate and water. A maximum intercalation, and hence a maximum degree of delamination, can be achieved with potassium acetate levels between 10% and 75% by weight, based on the weight of kaolin clay particles, and 5% and 50% water by weight, based on the weight of potassium acetate.

12 Claims, 7 Drawing Sheets

KAOLIN-POTASSIUM ACETATE INTERCALATION COMPLEX AND PROCESS OF FORMING SAME

TECHNICAL FIELD

This invention relates to an improved process for producing delaminated kaolin clays without the use of mechanical grinding. Specifically, potassium acetate is intercalated into the kaolin clay particles in the presence of water to achieve a high degree of intercalation leading to delamination of the kaolin clay particles.

The delaminated kaolin clay particles resulting from this process exhibit improved paper coating and filling properties when compared to the starting kaolin clay particles that have not been delaminated.

BACKGROUND OF THE INVENTION

Kaolin is a naturally occurring, relatively fine, white clay mineral which may be generally described as a hydrated aluminum silicate. Kaolin has long been used as a coating and filler pigment for paper. Use of kaolin as a coating pigment improves various properties, such as brightness, color, gloss, smoothness, opacity, uniformity of appearance and printability of a paper. As a filler, kaolin is used to extend fiber, reduce cost and improve opacity, brightness and other desirable characteristics.

A high grade kaolin clay as required in the coating of paper is typically prepared by a series of beneficiation steps, such as deflocculation, degritting, classification (fractionation), magnetic separation, bleaching, flocculation and filtration. Kaolin particles less than 2 microns in equivalent spherical diameter (esd) are highly desirable for paper coating and, therefore, the classification step is generally designed to remove (i.e., reject) most of the coarse particles greater than 2 microns. The rejected coarse particles may then be used as filler clay but generally are too coarse for paper coating applications. However, the demand and price for the filler clay is substantially lower than that of a coating clay.

In the kaolin industry, the coarse clay consisting of stacks or "books" can be delaminated into individual plates which then can be used as a coating pigment. The delaminated material has a high aspect ratio (mean diameter to thickness ratio) and gives better coating and printing properties, such as smoothness, gloss, opacity and coverage compared to the undelaminated kaolin clay at equivalent particle size distributions.

Delamination in the kaolin industry is typically accomplished by wet grinding of coarse kaolin clay in the presence of a medium harder than the kaolin, such as glass, plastic or sand beads. The process has been described in a publication by Feld et al., *Paper-coating clay from coarse Georgia kaolins by a new attrition-grinding process*, Report of Investigations No. 5697, U.S. Department of Interior, Bureau of Mines, 1960.

Gunn et al., in U.S. Pat. No. 3,171,718, disclose the preparation of improved kaolin clay for coating and other uses by subjecting coarse Georgia sedimentary kaolin clay to delamination. The delamination is performed by vigorous agitation of a clay slurry in the presence of non-abrasive grinding media, such as pellets of nylon or plastic, until the desired delamination of the clay particles is achieved. The resulting products are claimed to have high opacity and gloss.

Although it is desirable to delaminate the stacks of kaolin parallel to the plates, the conventional delamination process involves application of mechanical energy during sand milling or grinding, which unfortunately may result in a perpendicular fracture of the plates. Therefore, there is a need to develop a process to delaminate coarse kaolin particles without fracturing across the plates, thereby obtaining the maximum advantage of optical and other desirable properties of the delaminated kaolin.

The fracture of kaolin plates caused by conventional delamination processes may be minimized by using a milder chemical process to achieve delamination. This process is referred to as intercalation, which is defined as the reversible insertion of a molecule or compound (guest) into a layered material (host).

The chemical process of intercalation in kaolin can be visualized schematically in FIG. 1. The molecules are inserted between the layers which typically have a thickness of approximately 7.15 Å (1 micron ($\mu$m)=10,000 angstroms (Å)). A few to more than 100 such layers are stacked one on top of another to form a plate. Many plates are stacked together to form a stack or book. The layers of kaolin are expanded upon intercalation, and the expansion distance depends on the size of the molecule being intercalated.

Only certain types of compounds can form the intercalation complex with kaolin, and the extent of intercalation depends on many factors, such as type of kaolin, particle size, type of molecule, temperature, duration of intercalation and amount of water. All these factors need to be controlled carefully to achieve a maximum degree of intercalation.

The degree or extent of intercalation can be quantitatively estimated using X-ray powder diffraction (XRD) and the following equation:

$$\% \text{ Intercalation} = \frac{I_{(001)complex}}{I_{(001)complex} + I_{(001)kaolinite}} \times 100$$

where $I_{(001)\ complex}$ and $I_{(001)\ kaolinite}$ are the x-ray intensities of the basal reflection (d(001)) of the intercalated complex and the starting kaolin, respectively. For kaolinite, d(001) is the same as the thickness of one layer and refers to the basal spacing (thickness) of the 001 diffracting plane. For example, the original kaolinite has a d(001) spacing of 7.15 Å which increases to 14 Å after intercalation.

Velho and Gomes (Applied Clay Science, vol. 6, pp. 155–170, 1991) achieve a reduction in particle size and improvement in the whiteness and yellowness of kaolin by intercalating Portuguese kaolins with hydrazine. This method, however, calls for hydrazine intercalation followed by either vigorous mechanical agitation or sand grinding. The most effective treatment is achieved with hydrazine intercalation followed by vigorous mechanical agitation for 6 hours.

Weiss and Thielepape, in U.S. Pat. No. 3,309,211, disclose that the intercalation of kaolin clay with a variety of organic compounds followed by mechanical treatment improves the plastic and thixotropic characteristics of kaolin clay. Although no measurement of particle size is reported by these inventors, the desirable plastic and thixotropic properties may have been achieved because of some degree of delamination by intercalation followed by application of mechanical energy. In this patent and in U.S. Pat. No. 3,171,718, particle size reduction or the desirable plastic and thixotropic properties are obtained only after varying degrees of mechanical treatment.

Horton, in U.S. Pat. No. 3,520,719, discloses that intercalation of kaolin clay with a dialkyl sulfoxide followed by removal of the sulfoxide from the clay produces a coating pigment which can be used for printing with colorless, color-reactant dyes. The dye material reacts with the treated clay coated on paper to produce a colored mark on the paper.

Maiden, in U.S. Pat. No. 3,567,474, describes the bleaching of a kaolin clay by first intercalating the clay with urea followed by treating the complex with an oxidizing agent, such as hydrogen peroxide. In U.S. Pat. No. 3,666,513, Maiden discloses a process for improving the brightness of clay by intercalating with a reducing bleaching agent, such as hydrazine, and then decomposing the intercalation complex under nonoxidizing conditions.

Lim, in U.S. Pat. No. 3,899,343, discloses a process to improve the brightness of clay by intercalating the clay with dimethylsulfoxide followed by forming a soluble iron coordination compound with an iron-complexing ligand and then removing the complexed iron from the clay by washing. This patent to Lim and the two patents to Maiden described above utilize intercalation of kaolin, but for purposes other than delamination.

Potassium acetate has successfully been intercalated into kaolin clay previously. The earlier methods, however, involved either intensive grinding of the clay in a dry state or suspending the clay in an aqueous potassium acetate solution for long periods. For example, Wada reported a certain extent of intercalation after 20 minutes of grinding a mixture of dry kaolin and potassium acetate although considerable destruction of the crystal structure was observed (American Mineralogist, vol. 46, pp. 78–91, 1961). However, this procedure required a period of grinding or grinding followed by storage overnight (or longer) to achieve formation of a nearly complete intercalation complex.

Wiewiora and Brindley (Proceedings of the International Clay Conference, vol. 1, pp. 723–733, 1969) performed potassium acetate intercalation from solution phase by suspending a kaolin in an 8N potassium acetate solution followed by shaking for 2 hours, storage for a week in stoppered centrifuge tubes with intermittent shaking, centrifugation, removal of excess fluid and storing for another week. They observed that the extent of intercalation decreased as the particle size became smaller than 0.5 microns. In addition to the long times involved in the intercalation process described by these authors, their process uses substantially more solvent per g of kaolin and substantially more potassium acetate per g of kaolin as compared to the present invention.

Andrew et al. intercalated potassium acetate into kaolin by dry grinding potassium acetate and clay for 30 minutes with mortar and pestle followed by overnight storage at 70% relative humidity (Soil Science Proceedings, pp. 422–424, 1960). These authors used substantially more potassium acetate per g of kaolin as compared to the present invention.

Kristof et al. performed intercalation by suspending a kaolin in a highly concentrated (7.2N) potassium acetate solution for 80 hours followed by centrifugation, discarding the excess solution and air drying the wet clay for 2 weeks (Vibrational Spectroscopy, Vol. 5, pp. 61–67, 1993). Intercalation was verified by the expansion of the layers from 7.15 Å to 14 Å.

Previous methods of intercalating potassium acetate into kaolin clay involve mechanical grinding and/or other mechanical treatment for extremely long periods of time, extending to several weeks, in order to achieve intercalation of the potassium acetate. In addition, these methods result in fracture of plates perpendicular to the long axis of the plate, causing non-uniformity of the delaminated product. Such fractures have deleterious effects on the paper coating performance of the kaolin clay pigments.

SUMMARY OF THE INVENTION

In general terms, the present invention relates to an improved process for intercalating a kaolin with potassium acetate. This process also maximizes delamination and separation of kaolin plates from stacks without fracturing across the plates. This process involves blending a kaolin clay with potassium acetate in the presence of an appropriate amount of water. These ingredients may be added in any order provided the proper relative ratios of ingredients are achieved. No grinding of the mixture is necessary, although mechanical energy such as pug milling, sand milling or sonication may optionally be applied following the initial intercalation. Nearly complete intercalation is achieved within one hour.

The amount of potassium acetate can be varied from 10 to 75% by weight (preferably 20 to 70%, more preferably 22 to 60%, or most preferably 25 to 35%), based on the weight of kaolin clay. The amount of water ranges from 5 to 50% by weight (preferably 25 to 40%, and more preferably 30 to 35%), based on the weight of potassium acetate.

We have discovered that the amount of water controls the degree of intercalation of potassium acetate. For example, mixing a kaolin clay with potassium acetate in a dry state and storing the mixture in a desiccator produces no intercalation, regardless of the amount of potassium acetate. Similarly, the presence of water in excess of 60% by weight, based on the weight of potassium acetate, will also prevent intercalation. Over 90% of intercalation is achieved when water is present in an amount from 25 to 40% by weight, based on the weight of potassium acetate, and potassium acetate is present in excess of 25% by weight, based on the weight of kaolin clay.

Intercalation of potassium acetate is achieved by the mixing of kaolin, water and potassium acetate. Subsequent steps prepare the product for commercial use. Washing and filtration steps may be used as needed and may occur one or more times. Washing may occur at the pH of the mixture and preferably at a pH of 3 to remove intercalated potassium acetate. The final filter cake is usually diluted to a value between 20 and 65% solids (preferably 30 to 60%). The pH is adjusted to 6.5 using soda ash as needed, and an effective amount of a dispersant such as sodium polyacrylate is used. The pH should be increased to a value between 6.5 and 9 before spray drying. The material may also be sold as a slurry at these pH values. Other compounds may be used to adjust the pH, and other dispersants may be employed in the practice of this invention. After completion of these steps, the material may be spray dried.

Accordingly, there is a need to develop a process to delaminate kaolin clay particles without mechanical grinding or application of excessive mechanical force which frequently fractures the plates, thereby obtaining the maximum advantage of optical and other desirable properties of the delaminated kaolin. This process for delamination of kaolin clay particles should be fast and efficient and result in kaolin clay pigments with improved coating and printing properties compared to the undelaminated kaolin. This process should permit fast and efficient intercalation of kaolin clay particles with potassium acetate which avoids the need for mechanical treatment or storage for extended periods.

Accordingly, an object of this invention is to provide a process for delamination of coarse and fine-grained kaolin clay particles.

Another object of this invention is to provide an improved process for intercalation of potassium acetate into kaolin clay particles to form a kaolin-potassium acetate complex.

Another object of this invention is to achieve the maximum extent of intercalation with the kaolin-potassium acetate complex and to achieve a very high degree of delamination without the need to apply mechanical energy.

Further, another object of this invention is to produce a delaminated kaolin pigment that exhibits superior paper coating and printing properties such as smoothness, gloss, opacity and coverage compared to the starting kaolin material that has not been delaminated.

These and other objects, features and advantages of the present invention will become apparent from the following detailed description.

DESCRIPTION OF THE DRAWINGS

As shown in FIG. 1, intercalation of potassium acetate (black filled circles) into kaolin clay particles with the process of the present invention produces an intercalated complex with uniform expansion between the layers and plates.

FIG. 2 presents an analysis of the unintercalated feed kaolin clay of Example 2 (shown in FIG. 2). FIGS. 3–7 present an analysis of the products of Examples 2–6 intercalated with various amounts of potassium acetate (shown in FIGS. 3–7, respectively). A Scintag Pad V X-ray diffraction unit (Scintag, Inc., Sunnyvale, Calif.) using copper radiation is employed to obtain the data. The y-axis shows the intensity expressed in counts per second (CPS). Intensity is the energy per unit area per unit time (e.g., joules/meter$^2$/second). The x-axis displays the number of two-theta degrees (copper radiation) and peaks are indicated at 14 Å, 7.15 Å and 7.0 Å. Note that the size of the 14 Å peak in relationship to the 7.15 Å peak increases in FIGS. 2–7 as the amount of potassium acetate increases. This increase in the size of the 14 Å peak in relationship to the 7.15 Å peak indicates that the extent of intercalation has increased.

FIG. 2—A sample of a coarse fraction centrifuge reject (Kaogloss (KG) 90 rake—22% less than 2 µm) of a middle Georgia kaolin that has previously undergone froth floatation. This is unintercalated feed kaolin.

FIG. 3—Kaolin from Example 2 intercalated with 10% potassium acetate.

FIG. 4—Kaolin from Example 2 intercalated with 15% potassium acetate as described in Example 3.

FIG. 5—Kaolin from Example 2 intercalated with 20% potassium acetate as described in Example 4.

FIG. 6—Kaolin from Example 2 intercalated with 25% potassium acetate as described in Example 5.

FIG. 7—Kaolin from Example 2 intercalated with 30% potassium acetate as described in Example 6. The (002) refers to the second order diffraction lines from the 002 plane, which is always half of the first order reflection or (001).

DETAILED DESCRIPTION OF THE INVENTION

Figure 1:
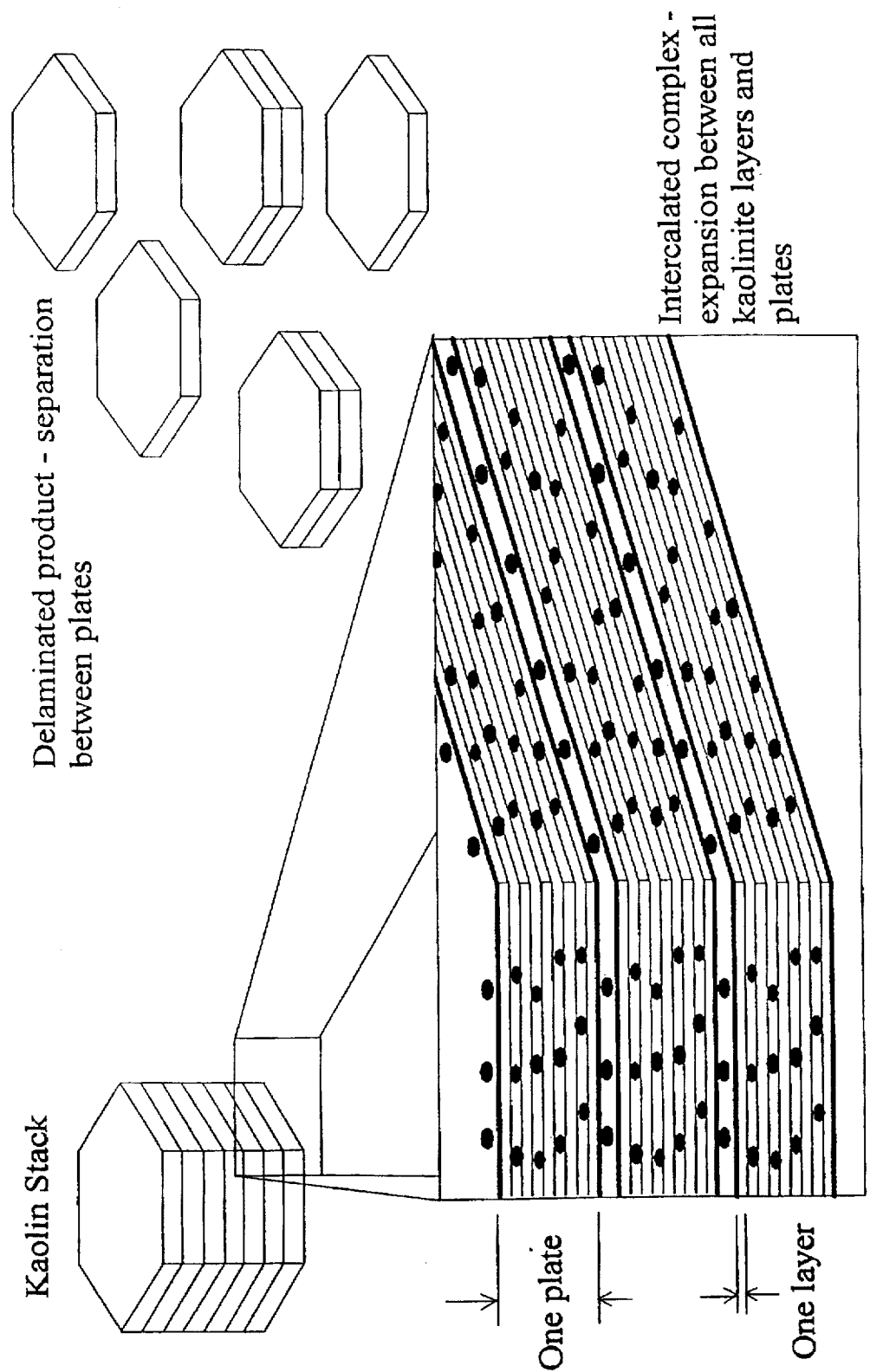
FIG. 1 schematically illustrates potassium acetate intercalation into a kaolin stack resulting in a delaminated product.

As indicated above, a kaolin-potassium acetate intercalation complex may be prepared in accordance with the process of this invention to produce delaminated kaolin pigments. In some instances the extent of intercalation achieved may be more than 90%. This process for forming a kaolin-potassium acetate intercalation complex, comprises the steps of mixing kaolin clay particles, potassium acetate and water until a substantially homogeneous mixture is obtained, wherein potassium acetate is present in the mixture in an amount from about 10 to 75% by weight, based on the weight of the kaolin clay particles, and water is present in the mixture in an amount from about 5 to 50% by weight, based on the weight of the potassium acetate.

Examples of the kaolin clay particles which may be used in this invention include Middle Georgia kaolin clays, East Georgia kaolin clays, fine-grained kaolin particles, coarse-grained kaolin particles, No. 1 high brightness coating clays (such as those sold under the trademark Kaogloss 90 by Thiele Kaolin Company, Sandersville, Ga.), No. 1 fine high brightness coating clays (such as those sold under the trademark Kaofine 90 by Thiele Kaolin Company), various other coating clays including Tertiary and Cretaceous kaolin clays, primary kaolin, residual kaolin and kaolin clays obtained from froth flotation, selective flocculation, magnetic separation, delamination and centrifugation, including classified rake.

If desirable, the dispersing agents which may be used in the process of this invention may be derived from any soluble dispersing compound, examples of which include sodium hexametaphosphate, tetrasodium pyrophosphate, sodium tripolyphosphate, monosodium phosphate, disodium phosphate, monoammonium phosphate, diammonium phosphate, sodium polyacrylate, lithium polyacrylate, ammonium polyacrylate, sodium silicate and mixtures thereof.

Opacity is one of the most desirable optical properties of pigment coated paper and is directly related to the light scattering ability of the pigment. The light scattering ability of the pigment can be estimated by the light scattering coefficient using the Kubelka-Munk equation as described in TAPPI 1978, Vol. 61, No. 6, pages 78–80. Light scattering is a direct function of the index of refraction of the mineral. Visible light travels through media of different refractive indices at different speeds; faster in a medium with a lower refractive index. As light travels between two media of different refractive indices, the light will change velocity and bend or change direction. Several changes of media and several bendings of incident light will create "scattered" light.

In addition to opacity, ink receptivity is a desired characteristic in many coated paper applications. Ink receptivity is the ability of a coating to absorb ink. An optimum ink receptivity is necessary to achieve an efficient transfer of ink to the paper during printing. Pigments created with mineral particles arranged to create pores for light scattering will also possess sufficient volume and capillary action in the open pores to absorb ink, thereby increasing the ink receptivity of the coated paper. The ink receptivity can be measured by applying the K & N ink to the coated samples for 2 minutes and then wiping off the excess ink. The brightness is measured before applying and after removing the ink. The percentage decrease in brightness is directly proportional to ink receptivity, that is, the larger the decrease in brightness, the more receptive the sample to application of ink. This test is described by J. C. Rice, Varnishing Characteristics of Coating Clays and Pigments, TAPPI, Vol. 39 (1), pp. 43–45, and in TAPPI Routine Control Method RC 19 (referenced on page 44 of the preceding article).

Water sensitivity is a test which measures the ability of the coated surface to accept ink and fountain solution simultaneously. During the test, ink and fountain solution are applied to the stock such that the fountain solution is spread onto the sheet prior to being printed. The water sensitivity test is rated by calculating the individual percentages of ink transfer, ink refusal and wet pick.

Ink transfer refers to the amount of ink that transfers to the coating on the paper. If the transfer is complete and there is no interference with transfer, there is 100% ink transfer and 0% interference. If anything interferes with the transfer of ink, there will be less than 100% transfer and some percentage of interference. A high ink transfer value is desirable.

Wet pick refers to a coating that has been solubilized by fountain solution and has picked off onto the blanket. Wet pick can cause print interference. Accordingly, a low wet pick rating is desirable.

Ink refusal is defined as the percentage of ink that is not transferred to the paper. Holdout is the inability of the coating to accept fountain solution which is applied prior to the application of ink. If the coating does not accept fountain solution, ink transfer will be deleteriously affected. As the degree of holdout increases, the percentage (%) of ink refusal increases. Holdout is a cause of print interference. Low values for holdout and ink refusal are desirable.

The number of passes to fail refers to the number of printing passes that a paper can withstand before coating pick is seen on the blanket. The maximum number of passes run on a test is typically 10, unless picking occurs earlier. The minimum number of passes the paper needs to withstand is typically 4.

The present invention is further illustrated by the following examples which are illustrative of certain embodiments designed to teach those of ordinary skill in the art how to practice this invention and to represent the best mode contemplated for carrying out this invention.

In the following examples and tables, various parameters such as light scattering ability, K & N ink receptivity, GE brightness, ISO brightness, etc. are determined using methods and tests as described above and referenced below. GE brightness of the clay pigment is measured using the TAPPI test method, T-646 om-94. ISO brightness of the clay pigment is measured using the TAPPI test method, T-532 pm-92.

EXAMPLE 1

This sample is a coarse fraction centrifuge reject called rake (13% less than 2 microns) of a Middle Georgia kaolin that has previously undergone froth flotation. The centrifuge product (finer fraction) is marketed by Thiele Kaolin Company as coating clay under the trademark Kaobrite 90 but is not used in this example.

2000 g of the coarse fraction centrifuge reject dry kaolin, known as Kaobrite 90 rake, is mixed with 880 g of potassium acetate and 318 g of deionized water to form a substantially homogeneous mixture, which is then allowed to sit for 24 hr. The mixture is then checked for the extent of intercalation by X-ray powder diffraction and found to be 96%. 100 g of the mixture is washed and filtered 2 times at the existing pH and washed for 2 additional times at pH=3 to remove the intercalated potassium acetate. The final filter cake is diluted to 30% solids, the pH adjusted to 6.5 using soda ash, and is then dispersed with 4 lb/ton (T) of sodium hexametaphosphate. The degree of delamination is determined by measuring the particle size with a Sedigraph unit (Micromeritics Co., Norcross, Ga.). The percentage of particles less than 2 microns in size increased from 13% for the starting material to 36% after intercalation and washing.

EXAMPLE 2

This sample is a coarse fraction centrifuge reject (22% less than 2 microns) of a Middle Georgia kaolin that has previously undergone froth flotation. The centrifuge product (finer fraction) is marketed by Thiele Kaolin Company as coating clay under the trademark Kaogloss 90 but is not used in this example.

About 1000 g of the coarse fraction centrifuge reject dry kaolin, known as Kaogloss 90 rake, is mixed with 111 g of potassium acetate and 37 g of deionized water to form a substantially homogeneous mixture, which is then allowed to sit for 24 hr. Next, the mixture is checked for the extent of intercalation by X-ray powder diffraction which is determined to be 60%. 100 g of the mixture is washed and filtered 2 times at the existing pH and washed for 2 additional times at pH=3 to remove the intercalated potassium acetate. The final filter cake is diluted to 30% solids. The pH is adjusted to 6.5 using soda ash and dispersed with 4 lb/T of sodium hexametaphosphate. The degree of delamination is determined by measuring the particle size by a Sedigraph unit.

EXAMPLE 3

The same procedure is followed as in Example 2, but the potassium acetate and water are increased to 176 and 59 g, respectively.

EXAMPLE 4

The same procedure is followed as in Example 2, but the potassium acetate and water are increased to 250 and 83 g, respectively.

EXAMPLE 5

The same procedure is followed as in Example 2, but the potassium acetate and water are increased to 333 and 111 g, respectively.

EXAMPLE 6

The same procedure is followed as in Example 2, but the potassium acetate and water are increased to 428 and 143 g, respectively.

The results from the procedures described in Examples 2 through 6 are shown in Table 1 and clearly demonstrate the dependence of the extent of intercalation on the amount of potassium acetate. Also note the significant reduction of particle size, that is, that the percentage of the particles less than 2 microns in the product increased from 23% to 45% after intercalating and washing as described in Example 6.

TABLE 1

| Example | 2 | 3 | 14 | 5 | 6 |
|---|---|---|---|---|---|
| % K-acetate | 10 | 15 | 20 | 25 | 30 |
| % Intercalation | 60 | 70 | 86 | 92 | 96 |
| % Kaolin clay particles less than 2 μm | 23 | 27 | 32 | 37 | 45 |

Figure 2:
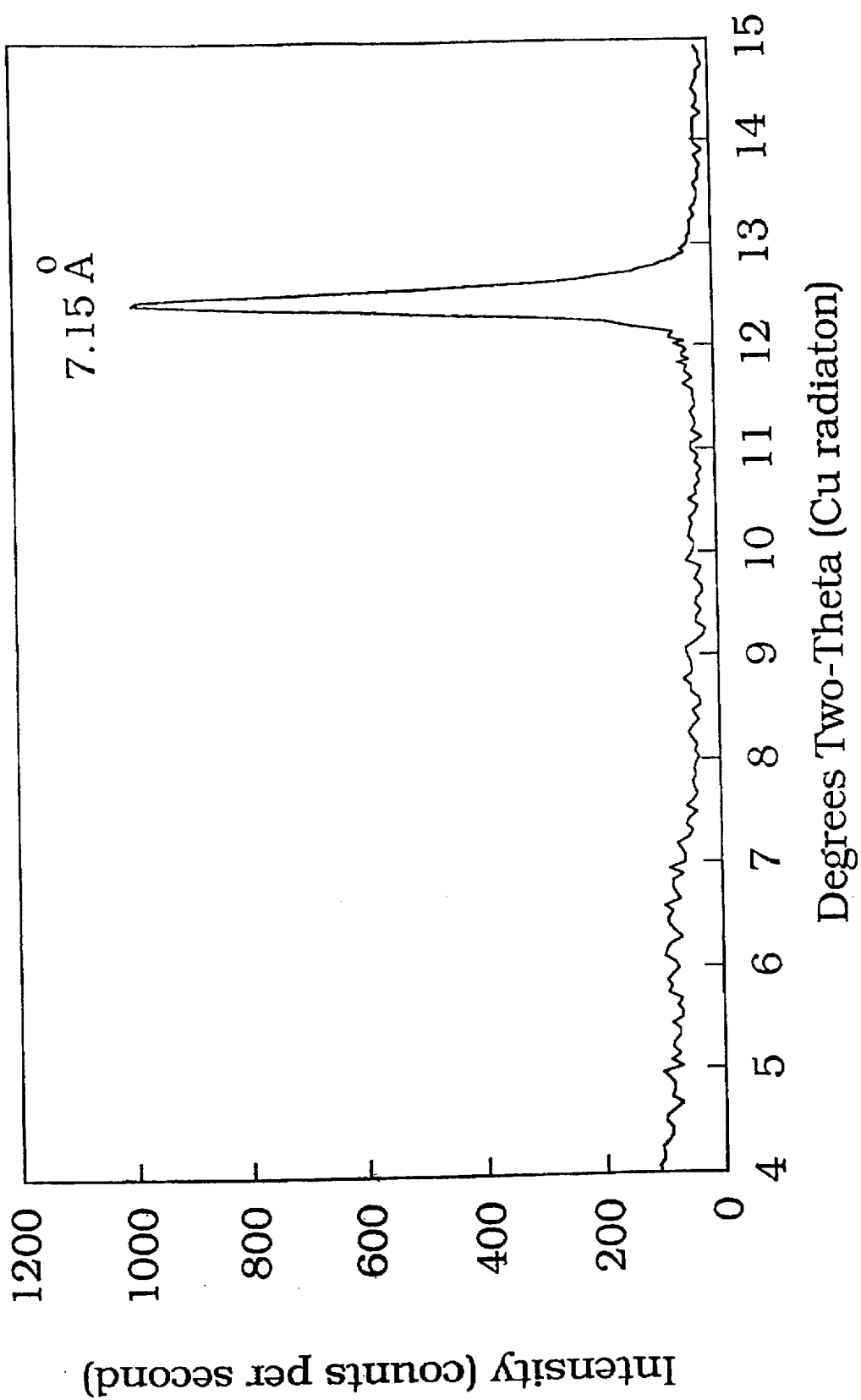
FIGS. 2–7 demonstrate the extent of potassium acetate intercalation using X-ray powder diffraction.
Figure 3:
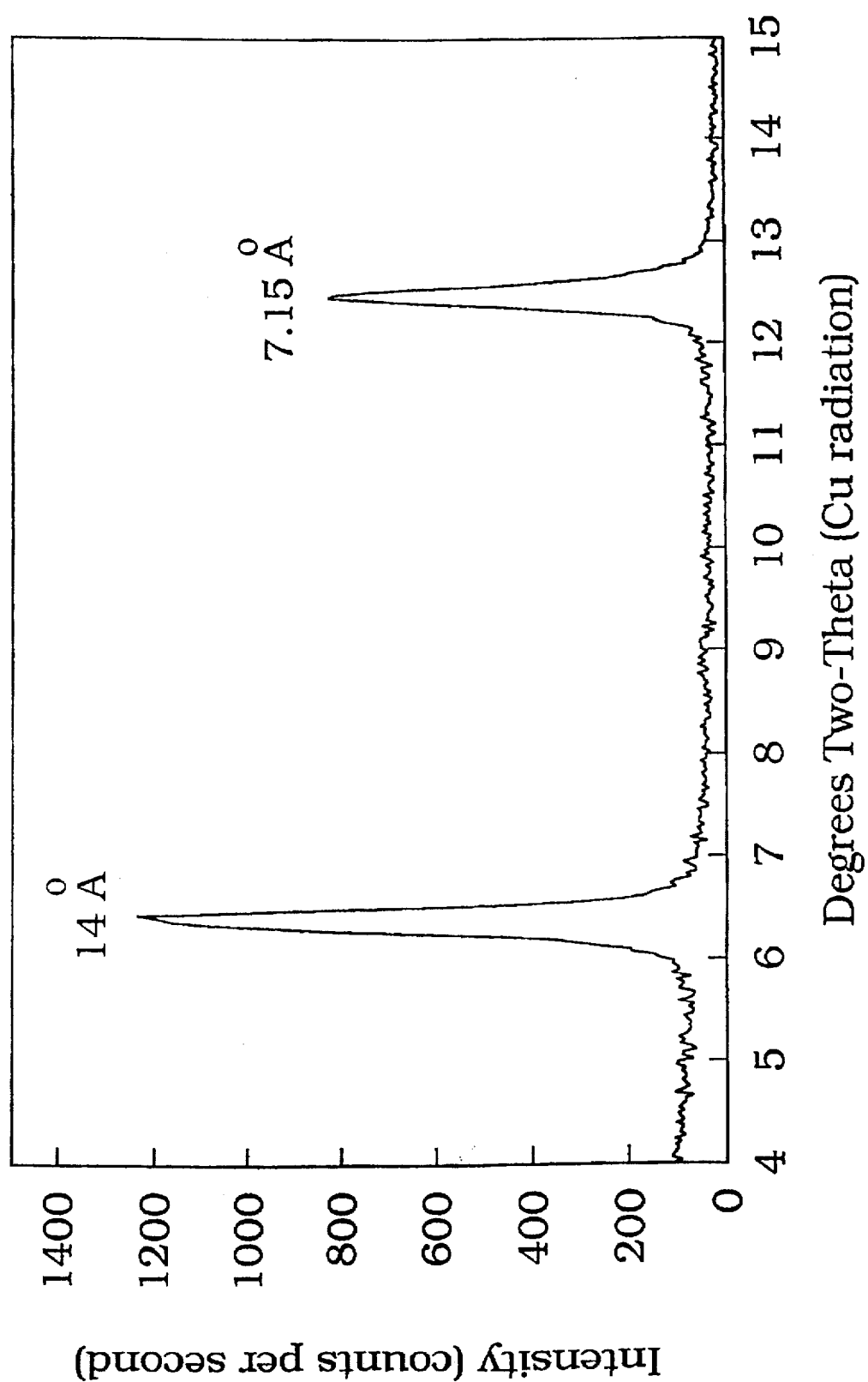
Figure 4:
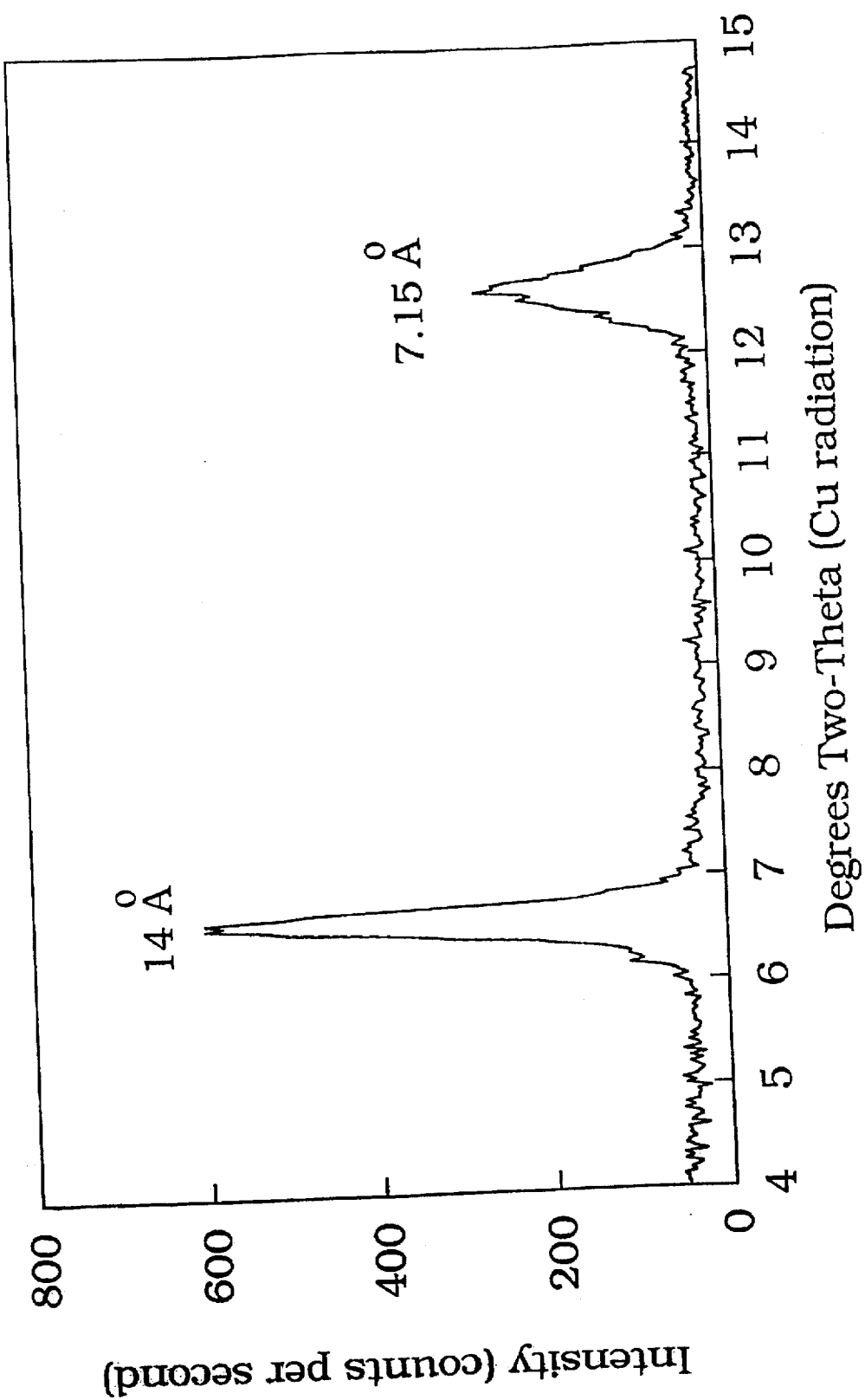
Figure 5:
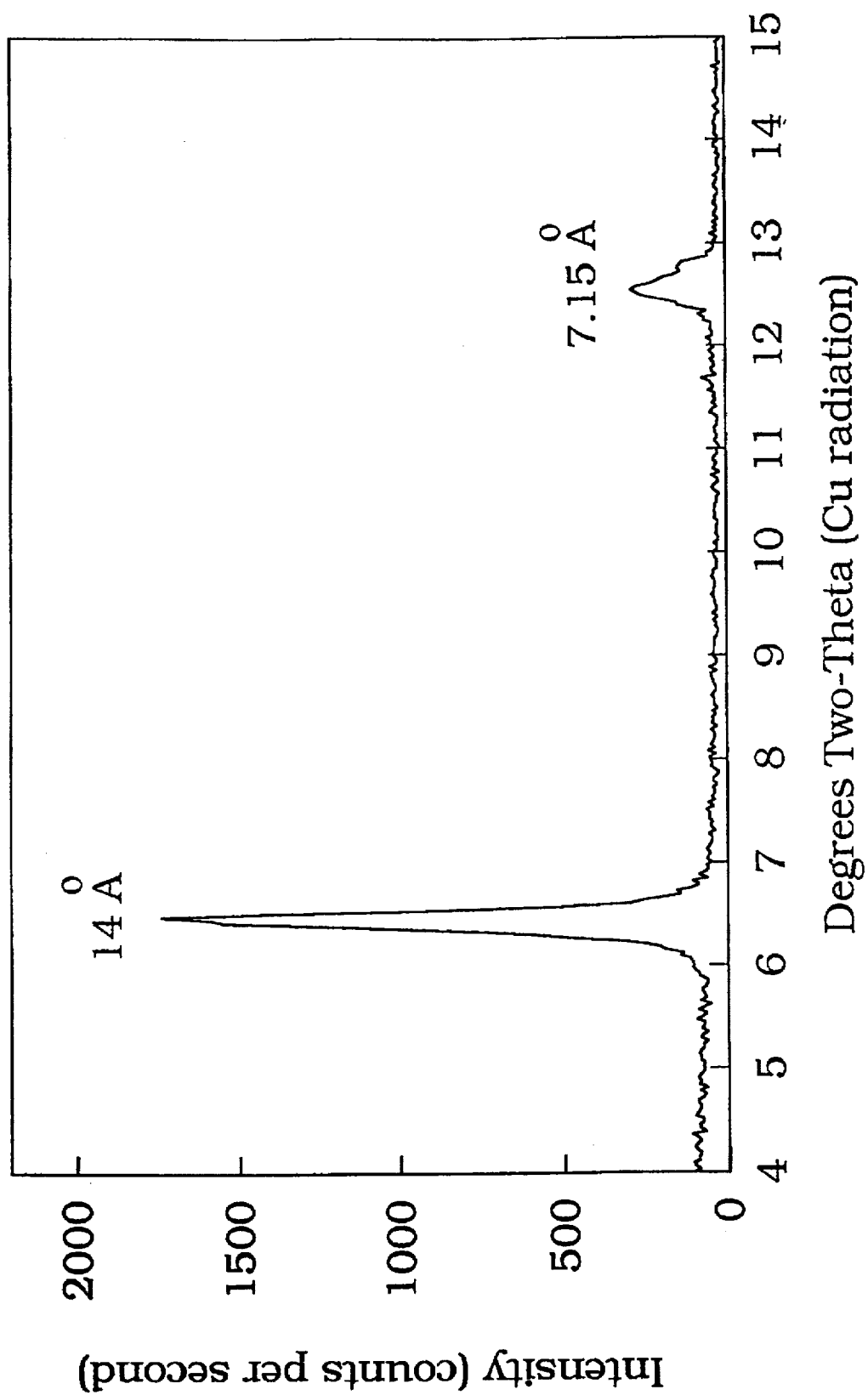
Figure 6:
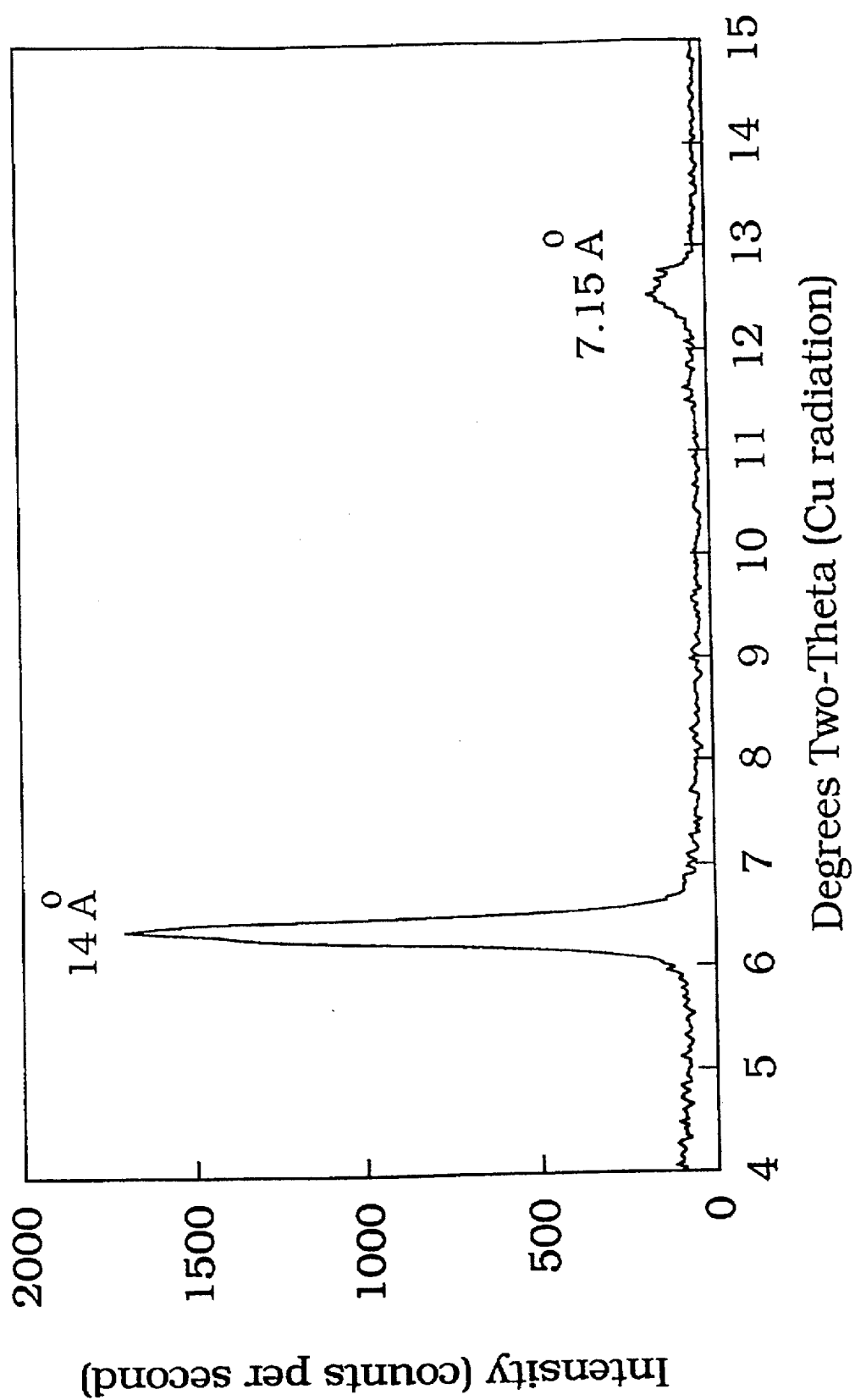
Figure 7:
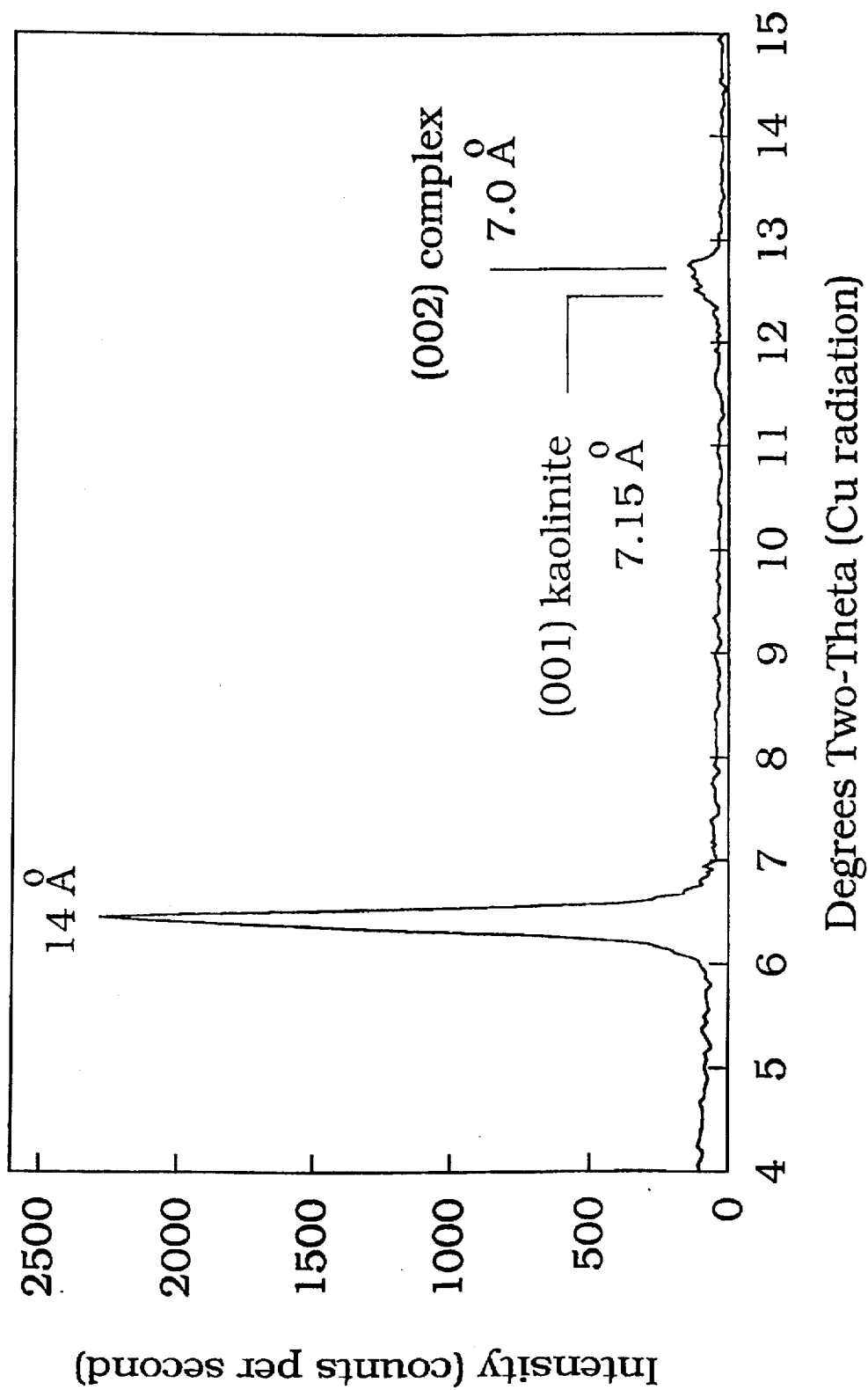

X-ray powder diffraction patterns for kaolins in Examples 2 through 6 are given in FIGS. 2 through 7. The starting kaolin (Kaogloss 90 rake) shows a peak at 7.15 Å, which is the thickness of the layer (FIG. 2). After intercalation with potassium acetate and water, part of the kaolin is converted to the kaolin-potassium intercalation complex exhibiting a peak at 14 Å (FIG. 3). As the amount of potassium acetate increases, the intensity of the peak at 14 Å (kaolin-potassium acetate intercalation complex) increases in relationship to the intensity of the peak at 7.15 Å (starting kaolin) which decreases (shown sequentially in FIGS. 4–7). With 25 to 30% potassium acetate/kaolin (Examples 5-6), the kaolin (92-96%) is substantially intercalated.

The following Examples 7-14 involve an analysis of the degree of potassium acetate intercalation into kaolin as a function of the amount of water. In these examples, the amounts of kaolin and potassium acetate are held constant while the amount of water is changed. In each of these examples, the resulting mixture is examined for the extent of intercalation by X-ray powder diffraction. These examples demonstrate that the amount of water is critical in maximizing potassium acetate intercalation into kaolin (see Table 2).

EXAMPLE 7

7 g of the dry kaolin used in Example 2 is mixed with 3 g of potassium acetate and 0.16 g of deionized water to form a substantially homogeneous mixture, which is then allowed to sit for 24 hr. The extent of intercalation is 10%.

EXAMPLE 8

7 g of the dry kaolin used in Example 2 is mixed with 3 g of potassium acetate and 0.33 g of deionized water to form a substantially homogeneous mixture, which is then allowed to sit for 24 hr. The extent of intercalation is 43 %.

EXAMPLE 9

7 g of the dry kaolin used in Example 2 is mixed with 3 g of potassium acetate and 0.75 g of deionized water to form a substantially homogeneous mixture, which is then allowed to sit for 24 hr. The extent of intercalation is 85%.

EXAMPLE 10

7 g of the dry kaolin used in Example 2 is mixed with 3 g of potassium acetate and 1.0 g of deionized water to form a substantially homogeneous mixture, which is then allowed to sit for 24 hr. The extent of intercalation is 96%.

EXAMPLE 11

7 g of the dry kaolin used in Example 2 is mixed with 3 g of potassium acetate and 1.29 g of deionized water to form a substantially homogeneous mixture, which is then allowed to sit for 24 hr. The extent of intercalation is 94%.

EXAMPLE 12

7 g of the dry kaolin used in Example 2 is mixed with 3 g of potassium acetate and 2.0 g of deionized water to form a substantially homogeneous mixture, which is then allowed to sit for 24 hr. The extent of intercalation is 89%.

EXAMPLE 13

7 g of the dry kaolin used in Example 2 is mixed with 3 g of potassium acetate and 3.0 g of deionized water to form a substantially homogeneous mixture, which is then allowed to sit for 24 hr. The extent of intercalation is 74%.

EXAMPLE 14

7 g of the dry kaolin used in Example 2 is mixed with 3 g of potassium acetate and 4.5 g of deionized water to form a substantially homogeneous mixture, which is then allowed to sit for 24 hr. The extent of intercalation is 0%.

TABLE 2

| Example | 7 | 8 | 9 | 10 | 11 | 12 | 13 | 14 |
|---|---|---|---|---|---|---|---|---|
| % water/K-acetate | 5 | 10 | 20 | 25 | 30 | 40 | 50 | 60 |
| % Intercalation | 10 | 43 | 85 | 96 | 94 | 89 | 74 | 0 |

Examples 15 through 17 demonstrate the rapidity of the present process for achieving a high degree of potassium acetate intercalation into kaolin by examining the effect of time on the extent of intercalation.

EXAMPLE 15

2000 g of the dry kaolin used in Example 2 is mixed with 880 g of potassium acetate and 318 g of water to form a substantially homogeneous mixture, which is then allowed to sit for 3 hours. The extent of intercalation is 85%.

EXAMPLE 16

The same procedure is followed as in Example 15, but the mixture is allowed to sit for 5 hours. The extent of intercalation is 93 %.

EXAMPLE 17

The same procedure is followed as in Example 15, but the mixture is allowed to sit for 20 hours. The extent of intercalation is 96%.

Example 18 shows that kaolin with a finer particle size distribution can also be successfully intercalated using the process of the present invention.

EXAMPLE 18

This sample is a spray dried Cretaceous Middle Georgia crude kaolin which is settled to achieve a particle size distribution of 85% less than 2 µm and 36% less than 0.5 µm. 4000 g of this kaolin is intercalated with 1720 g potassium acetate and 580 g water to form a substantially homogeneous mixture, which is then allowed to sit for 16 hours. The degree of intercalation is 86% and the percentages of particle sizes less than 2 µm and less than 0.5 µm are 92% and 55%, respectively.

The following examples demonstrate that the products prepared by the process of the present invention are suitable for paper coating applications.

EXAMPLE 19

Three samples are prepared and evaluated in a typical coating formulation for their suitability in a light weight paper coating application. Coated sheet properties are analyzed according to standard techniques in the industry.

Sample A is prepared from the crude sample used in Example 18 but settled to 92% less than 2 µm. After settling, the sample is leached at 8 lb/T sodium hydrosulfite leach and 2 lb/T alum and double filtered. The filtered sample is diluted to 20% solids, pH adjusted to 7 and spray dried.

Sample B is prepared using the crude sample of Example 18 with the conventional delamination process, in which a 25% (weight %) kaolin suspension is stirred in the presence of 10-100 mesh glass beads for 10 minutes. The delaminated sample is leached at 8 lb/T sodium hydrosulfite leach and 2 lb/T alum and double filtered. The filtered sample is diluted to 20% solids, pH adjusted to 7 and spray dried.

Sample C is prepared using the intercalation procedure of Example 18, but the intercalated sample is washed twice at 20% solids and leached at 8 lb/T sodium hydrosulfite leach and 2 lb/T alum, and double filtered. The filtered sample is diluted to 20% solids, pH adjusted to 7 and spray dried.

Various coated sheet and print properties are presented in Table 3. The data in Table 3 indicate that at equivalent particle size, the undelaminated sample (A), conventionally delaminated sample (B) and the product of this invention (C) are similar in coated sheet properties; however, product (C) displays improved print properties compared to the other two products.

TABLE 3

| Example 19 | A | B | C |
|---|---|---|---|
| Particle Size % <2 μm | 92 | 92 | 92 |
| Coat Weight lbs/3300 ft² | 5.2 | 5.3 | 5.3 |
| ¹Gloss | 50 | 50 | 51 |
| ¹Brightness | 70.0 | 70.2 | 69.7 |
| ¹Opacity | 81.9 | 81.9 | 81.5 |
| ¹Ink Receptivity | 17.9 | 17.8 | 16.3 |
| ¹Pick Strength | 32 | 30 | 31 |
| ²Ink Transfer | 44 | 36 | 62 |
| ²Ink Refusal | 17 | 3 | 26 |
| ²Wet Pick | 39 | 61 | 12 |
| ²# Passes to Fail | 5 | 5 | 6 |

¹Coated sheet properties;
²Print properties

EXAMPLE 20

Three samples (D–F) with particle sizes of 75–77% less than 2 μm are prepared and evaluated in a typical light weight paper coating formulation. The samples are prepared from the starting feed (Kaogloss 90 rake—22% less than 2 μm) similar to that described in Example 2.

Sample D is prepared from the starting feed using a conventional sand mill delamination process at about 35% solids for 18 minutes. The particle size at less than 2 μm of the sand milled sample is 47%. The sand milled sample is then classified to 76% less than 2 μm particle size, leached with 6 lb/T sodium hydrosulfite and 2 lb/T alum, adjusted to neutral pH and spray dried.

Samples E and F are prepared by mixing 3690 g starting feed with 1581 g potassium acetate and 586 g water. The extent of intercalation is analyzed by X-ray powder diffraction and found to be 97%. Half of the intercalated sample is washed twice (diluting to 25 wt % and filtering) to remove the potassium acetate, dried and pulverized, and intercalated again using 1700 g kaolin, 730 g potassium acetate, and 270 g water. The extent of intercalation is again found to be 97%. The double intercalated product is then washed twice, leached, and washed twice again. The particle size at less than 2 μm of the double intercalated sample is 48%. It is then classified to 75% less than 2 μm, diluted to 20% solids, adjusted to neutral pH, and spray dried. This is referred to as Sample E.

The other half of the sample (1000 g) which is intercalated only once is pug milled with 250 g water per pug mill batch for 8 minutes. The sample is washed twice, leached and washed twice again. The particle size is 54% less than 2 μm. This product is then classified to 77% less than 2 μm, diluted to 20% solids, adjusted to neutral pH and spray dried. This is referred to as Sample F.

The coated sheet data in Table 4 show that the intercalated products with or without pug milling are similar to the product prepared using conventional sand mill delamination in most coated sheet properties. The product E is, however, improved over the product D in opacity and ink receptivity, although the former has slightly lower gloss. The print test data (Table 4) also indicate that both the products of this invention (E and F) are improved over the product prepared using the conventional sand mill delamination (Sample D) in key print properties.

TABLE 4

| Example 20 | D | E | F |
|---|---|---|---|
| Particle Size % <2 μm | 76 | 75 | 77 |
| <1 μm | 54 | 53 | 58 |
| <0.2 μm | 13 | 9 | 11 |
| Coat Wt., lbs/3300 ft² | 4.8 | 5.1 | 4.7 |
| ¹Gloss | 49 | 46 | 52 |
| ¹Brightness | 67.2 | 67.8 | 67.2 |
| ¹Opacity | 77.7 | 78.7 | 78.1 |
| ¹Ink Receptivity | 15.7 | 16.7 | 15.0 |
| ¹Pick Strength | 79 | 76 | 77 |
| ²Ink Transfer | 64 | 83 | 94 |
| ²Ink Refusal | 17 | 5 | 5 |
| ²Wet Pick | 20 | 12 | 1 |
| ²# Passes to Fail | 6 | 6 | 6 |

¹Coated sheet properties
²Print properties

TABLE 5

| EXAMPLE | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Kaolin (g) | 2,000 | 1,000 | 1,000 | 1,000 | 1,000 | 1,000 | 7 | 7 | 7 | 7 | 7 | 7 | 7 | 7 |
| Potassium Acetate (g) | 880 | 111 | 176 | 250 | 333 | 428 | 3 | 3 | 3 | 3 | 3 | 3 | 3 | 3 |
| Water (g) | 318 | 37 | 59 | 83 | 111 | 143 | 0.16 | 0.33 | 0.75 | 1 | 1.29 | 2 | 3 | 4.5 |
| Potassium Acetate/Kaolin (%) | 31 | 10 | 15 | 20 | 25 | 30 | 30 | 30 | 30 | 30 | 30 | 30 | 30 | 30 |
| Water/Kaolin (%) | 14 | 4 | 6 | 8 | 10 | 13 | 2 | 5 | 10 | 13 | 16 | 22 | 30 | 39 |
| Water/Potassium Acetate (%) | 27 | 25 | 25 | 25 | 25 | 25 | 5 | 10 | 20 | 25 | 30 | 40 | 50 | 60 |
| Intercalation (%) | 96 | 60 | 70 | 86 | 92 | 96 | 10 | 43 | 85 | 96 | 94 | 89 | 74 | 0 |

Summary of Examples 1–14 in terms of amounts (g) of kaolin, potassium acetate and water, their relative percentages and the resulting percentages of intercalation.

The invention has been described in detail with particular reference to certain embodiments, but variations and modifications can be made without departing from the spirit and the scope of the invention as defined in the appended claims.

We claim:

1. A process for forming a kaolin-potassium acetate intercalation complex, comprising:

mixing kaolin clay particles, potassium acetate and water until a substantially homogeneous mixture is obtained, wherein potassium acetate is present in the mixture in an amount from about 10 to 75% by weight, based on the weight of the kaolin clay particles, and water is present in the mixture in an amount from about 5 to 50% by weight, based on the weight of the potassium acetate.

2. The process of claim 1, wherein the amount of potassium acetate in the mixture is from about 22 to 60% by weight.

3. The process of claim 1, wherein the amount of potassium acetate in the mixture is from about 25 to 35% by weight.

4. The process of claim 1, wherein the amount of water in the mixture is from about 25 to 40% by weight.

5. The process of claim 1, wherein the amount of water in the mixture is from about 30 to 35% by weight.

6. The process of claim 1, wherein the amount of water in the mixture is from about 25 to 40% by weight and the amount of potassium acetate in the mixture is from about 25 to 70% by weight.

7. The process of claim 1, wherein the kaolin clay particles are selected from the group consisting of Tertiary kaolin, Cretaceous kaolin, Middle Georgia kaolin, East Georgia kaolin, residual kaolin, primary kaolin, and classified rake.

8. The process of claim 1, wherein the substantially homogeneous mixture is washed and filtered one or more times to produce a filter cake.

9. A delaminated kaolin clay pigment suitable for paper coating and filler applications produced by the process of claim 8.

10. The process of claim 8, wherein the mixture is washed at a pH of approximately 3.

11. The process of claim 8, wherein after washing and filtering, the filter cake is diluted to 20–65% solids to make a mixture, the pH of the mixture is adjusted to approximately 6.5 with soda ash and an effective amount of dispersant is added to the mixture, and then the mixture is spray dried.

12. The process of claim 1, wherein the process is performed in the absence of mechanical grinding.

* * * * *

UNITED STATES PATENT AND TRADEMARK OFFICE
CERTIFICATE OF CORRECTION

PATENT NO. : 5,672,555

DATED : September 30, 1997

INVENTOR(S) : Chris B. Maxwell and Prakash B. Malla

It is certified that error appears in the above-identified patent and that said Letters Patent is hereby corrected as shown below:

At column 2, line 22, after the word "being", please delete [intercalate&] and insert --intercalated-- therefor.

At column 8, Table 1, line 50, in the row starting with the word "Example", please delete [14] and insert --4-- therefor.

At column 12, line 15, after the word "The", please delete [prim] and insert --print-- therefor.

Signed and Sealed this

Seventeenth Day of February, 1998

*Attest:*

BRUCE LEHMAN

*Attesting Officer*  *Commissioner of Patents and Trademarks*